(12) United States Patent
Caldwell et al.

(10) Patent No.: US 11,305,380 B2
(45) Date of Patent: Apr. 19, 2022

(54) METHOD OF DETERMINING INTENSITY OF LASER LIGHT DELIVERED TO A WELD AREA BY LASER DELIVERY BUNDLES

(71) Applicant: Branson Ultrasonics Corporation, Danbury, CT (US)

(72) Inventors: Scott Caldwell, New Milford, CT (US); Christopher Almonte, Rochester, NY (US)

(73) Assignee: Branson Ultrasonics Corporation, Brookfield, CT (US)

( * ) Notice: Subject to any disclaimer, the term of this patent is extended or adjusted under 35 U.S.C. 154(b) by 733 days.

(21) Appl. No.: 16/251,359

(22) Filed: Jan. 18, 2019

(65) Prior Publication Data

US 2019/0224779 A1   Jul. 25, 2019

Related U.S. Application Data

(60) Provisional application No. 62/620,217, filed on Jan. 22, 2018.

(51) Int. Cl.
*B23K 26/064* (2014.01)
*B29C 65/00* (2006.01)
(Continued)

(52) U.S. Cl.
CPC .......... *B23K 26/064* (2015.10); *B23K 26/035* (2015.10); *B23K 26/067* (2013.01); *B23K 26/21* (2015.10); *B23K 26/705* (2015.10); *B29C 65/1612* (2013.01); *B29C 65/1635* (2013.01); *B29C 65/1667* (2013.01); *B29C 65/1687* (2013.01); *B29C 66/1122* (2013.01); *B29C 66/41* (2013.01); *B29C 66/73921* (2013.01); *B29C 66/8322* (2013.01); *B29C 66/9131* (2013.01); *B29C 66/9161* (2013.01); *B29C 66/91631* (2013.01); *B29C 66/967* (2013.01);
(Continued)

(58) Field of Classification Search
CPC ............ B29C 65/1687; B29C 65/1667; B29C 65/1635; B29C 65/1612; B29C 65/16; B23K 26/21; B23K 26/064
See application file for complete search history.

(56) References Cited

U.S. PATENT DOCUMENTS 6,329,629 B1   12/2001   Grewell
6,528,755 B2   3/2003   Grewell et al.
(Continued)

FOREIGN PATENT DOCUMENTS

EP         0817697 B1    8/2003
FR         3010785 A1    3/2015
WO   WO-2018217925 A1   11/2018

OTHER PUBLICATIONS

International Search Report and Written Opinion regarding PCT/US2019/014320, dated Apr. 26, 2019.

*Primary Examiner* — Daniel McNally
(74) *Attorney, Agent, or Firm* — Harness, Dickey & Pierce, P.L.C.

(57) ABSTRACT

A method for sensing intensity of laser light in a simultaneous laser welding system includes placing a smart part in a weld area. The smart part includes at least a laser light intensity sensor for sensing laser light directed at it. Laser light intensity is sensed by the laser light intensity sensor of the smart part which provides an output signal indicative thereof to a controller.

14 Claims, 4 Drawing Sheets

(51) Int. Cl.
*B23K 26/035* (2014.01)
*G01J 1/42* (2006.01)
*B29C 65/16* (2006.01)
*B23K 26/067* (2006.01)
*B23K 26/70* (2014.01)
*B23K 26/21* (2014.01)
*G02B 6/42* (2006.01)
*G02B 6/10* (2006.01)

(52) U.S. Cl.
CPC ............... *G01J 1/42* (2013.01); *G01J 1/4257* (2013.01); *G02B 6/4296* (2013.01); *B29C 65/1696* (2013.01); *G02B 6/102* (2013.01)

(56) References Cited

U.S. PATENT DOCUMENTS

| | | |
|---|---|---|
| 6,713,713 B1 | 3/2004 | Caldwell et al. |
| 7,085,296 B2 | 8/2006 | Caldwell |
| 7,343,218 B2 | 3/2008 | Caldwell et al. |
| 7,723,640 B2 | 5/2010 | Caldwell et al. |
| 8,307,900 B2 | 11/2012 | Lynde et al. |
| 2007/0265726 A1* | 11/2007 | Caldwell ........... B29C 66/73921 700/166 |
| 2016/0228987 A1* | 8/2016 | Baudimont .......... B23K 26/342 |

* cited by examiner

METHOD OF DETERMINING INTENSITY OF LASER LIGHT DELIVERED TO A WELD AREA BY LASER DELIVERY BUNDLES

CROSS-REFERENCE TO RELATED APPLICATIONS

This application claims the benefit of U.S. Provisional Application No. 62/620,217 filed on Jan. 22, 2018. The entire disclosure of the above application is incorporated herein by reference.

FIELD

The present disclosure relates a method of determining intensity of laser light delivered to a weld area by laser delivery bundles.

BACKGROUND

This section provides background information related to the present disclosure which is not necessarily prior art.

Laser welding is commonly used to join plastic or resinous parts, such as thermoplastic parts, at a welding zone.

There are many different laser welding technologies. One useful technology is simultaneous through transmissive infrared welding, referred to herein as STTIr. In STTIr, the full weld path or area (referred to herein as the weld path) is simultaneously exposed to laser radiation, such as through a coordinated alignment of a plurality of laser light sources, such as laser diodes. An example of STTIr is described in U.S. Pat. No. 6,528,755 for "Laser Light Guide for Laser Welding," the entire disclosure of which is incorporated herein by reference. In STTIr, the laser radiation is typically transmitted from one or more laser sources to the parts being welded through one or more optical waveguides which conform to the contours of the parts' surfaces being joined along the weld path.

Figure 1:
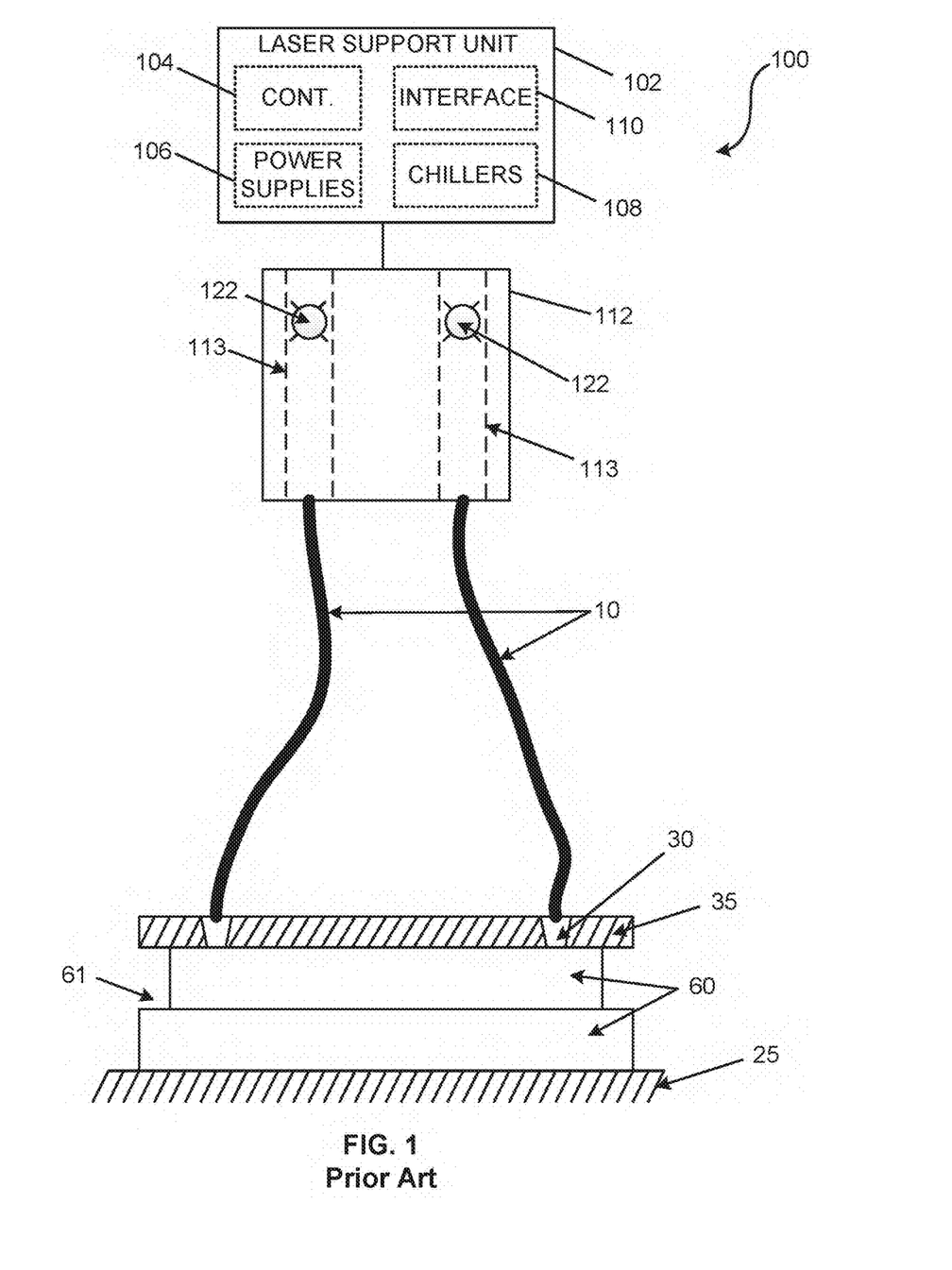
FIG. 1 is a schematic view illustrating a prior art simultaneous laser welding system.

FIG. 1 shows an example of a prior art STTIr laser welding system 100. STTIr laser welding system includes a laser support unit 102 including one or more controllers 104, an interface 110, one or more power supplies 106, and one or more chillers 108. The STTIr laser welding system may also include an actuator, one or more laser banks 112, and an upper tool/waveguide assembly 35 and a lower tool 25 fixtured on a support table. Each laser bank 112 has one or more laser channels 113 with each laser channel 113 having a laser light source 122. Laser support unit 102 is coupled to the actuator and each laser bank 112 and provides power and cooling via power supply (or supplies) 106 and chiller (or chillers) 108 to laser bank(s) 112 and controls the actuator and laser bank(s) 112 via controller 104. The actuator is coupled to either the upper tool/waveguide assembly and/or to the lower tool and moves them towards each other under control of controller 104.

In operation, laser light generated by the laser light sources 122 of laser channels 113 are directed through a plurality of laser delivery bundles 10 with each laser delivery bundle 10 associated with one of laser channels 113. In some aspects, each laser delivery bundle 10 is a fiber optic bundle and in some aspects, further split into legs and each leg includes at least a laser delivery optical fiber. If laser delivery bundle 10 is not split into legs, then each laser delivery bundle 10 is includes at least a laser delivery optical fiber. Each laser delivery bundle 10 delivers laser light from its associated laser channel 113 to a waveguide 30 that then delivers the laser light to a plurality of work pieces 60 to be welded together that are disposed in a weld area 61. Waveguide 30 homogenizes the laser energy delivered to work pieces 60 through each laser delivery optical fiber.

To ensure repeatable accurate and comprehensive welds during multiple weld cycles, maintaining the integrity of the laser delivery bundles is critical.

SUMMARY

This section provides a general summary of the disclosure, and is not a comprehensive disclosure of its full scope or all of its features.

According to an aspect, a method for determining intensity of laser light at a weld area of a simultaneous laser welding system is provided. The simultaneous laser welding system has a plurality of laser channels controlled by a controller and a corresponding plurality of fiber optic bundles with each one of the laser channels coupled to an associated one of the plurality of fiber optic bundles, each laser channel having a laser light source. The method includes placing a smart part having a laser light intensity sensor corresponding to each fiber optic bundle in a weld area. It also includes directing laser light from the laser light source of each laser channel through the fiber optic bundle corresponding to that laser channel to the weld area. It also includes sensing the laser light from each fiber optic bundle with the laser light intensity sensor of the smart part corresponding to the fiber optic bundle and outputting from each laser light intensity an output signal indicative of the intensity of the laser light sensed by that light intensity sensor which is provided to a controller. It also includes determining with the controller the intensity of laser light at the weld area provided by each laser channel based on the output signal from each laser light intensity sensor.

In an aspect, the method further includes disposing a waveguide around the smart part and delivering the laser light from each fiber optical bundle through the waveguide to homogenize the laser light with the waveguide before the laser light impinges on the smart part.

In an aspect, the method includes for each laser channel, comparing with the controller the intensity of laser light sensed by the smart part laser light intensity sensor corresponding to the fiber optic bundle associated with that laser channel with an expected intensity and determining with the controller that an integrity of that fiber optic bundle has degraded when the intensity of the laser light sensed by the smart part sensor is less than the expected intensity by at least a predetermined amount.

In an aspect, the method includes for each laser channel, controlling the laser channel with the controller to adjust an intensity of laser light generated by the laser light source of the laser channel based on the intensity of laser light sensed by the smart part laser light intensity sensor corresponding to the fiber optic bundle associated with that laser channel laser so that the intensity of laser light at that smart part laser light intensity sensor is at desired level.

In an aspect, the method includes controlling the laser channels with the controller to adjust an intensity of laser light generated by the laser light sources of the laser channels based on the intensity of laser light sensed by the smart part laser light intensity sensors so that the intensity of laser light at the smart part is at desired level.

In an aspect, the method includes disposing a filter translucent at a wavelength of the laser light between the sensors of the smart part and the waveguide to spread the laser light across the sensors.

In an aspect, the method includes displaying via the controller an image indicative of the intensity of the sensed laser light based on the output signals of the laser light intensity sensors.

The method includes directing laser light via a laser light source from a laser bank through a plurality of laser channels. Each laser channel directs said laser light through to at least a laser delivery optical fiber and each laser delivery optical fiber delivers the laser light through a waveguide to a smart part located between the waveguide and an anvil, wherein the smart part is comprised of sensors. The laser light is sensed with the sensors. The sensors then output a signal indicative of the sensed laser light to a controller. The controller determines the output of laser light through the laser delivery optical fiber based on the output signal indicative of the sensed laser light.

In an aspect, the method includes any two or more of the foregoing aspects.

According to another aspect, a simultaneous laser welding system comprises a plurality of laser channels. Each laser channel has a laser light source. There is a corresponding plurality of fiber optic bundles to the plurality of laser channels. Each fiber optic bundle has two ends, and each laser channel is coupled to an associated one of the plurality of fiber optic bundles at the first ends of each of the plurality of fiber optic bundles. The second ends of each of the plurality of fiber optic bundles defines a weld area. A smart part is located in the weld area. The smart part is comprised of at least a laser light intensity sensor corresponding to each fiber optic bundle. The laser light intensity sensor generates and transmits an output signal indicative of the intensity of laser light sensed by the laser light intensity sensor. A controller is configured to control the plurality of laser channels. The controller is further configured to receive the output signal from the laser light intensity sensor. The controller is further configured to determine the intensity of laser light at the weld area provided by each laser channel based on the output signal from each laser light intensity sensor.

In an aspect, a waveguide is disposed around the smart part. The waveguide homogenizes laser light traveling from the first ends of each of the plurality of fiber optic bundles through the second ends of each of the plurality of fiber optic bundles.

In an aspect, the controller is further configured to compare the intensity of laser light sensed by the smart part laser light intensity sensor corresponding to the fiber optic bundle associated with that laser channel with an expected intensity and determine that an integrity of that fiber optic bundle has degraded when the intensity of the laser light sensed by the smart part sensor is less than the expected intensity by at least a predetermined amount.

In an aspect, the controller is further configured to control the laser channel to adjust an intensity of laser light generated by the laser light source of the laser channel based on the intensity of laser light sensed by the smart part laser light intensity sensor corresponding to the fiber optic bundle associated with that laser channel laser so that the intensity of laser light at that smart part laser light intensity sensor is at desired level.

In an aspect, the controller is further configured to adjust an intensity of laser light generated by the laser light sources of the laser channels based on the intensity of laser light sensed by the smart part laser light intensity sensors so that the intensity of laser light at the smart part is at desired level.

In an aspect, a filter is disposed between the sensors of the smart part and the waveguide. The filter is translucent at a wavelength of the laser light to spread the laser light across the sensors.

In an aspect, the controller is configured to display an image indicative of the intensity of the sensed laser light based on the output signals of the laser light intensity sensors.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Figure 2:
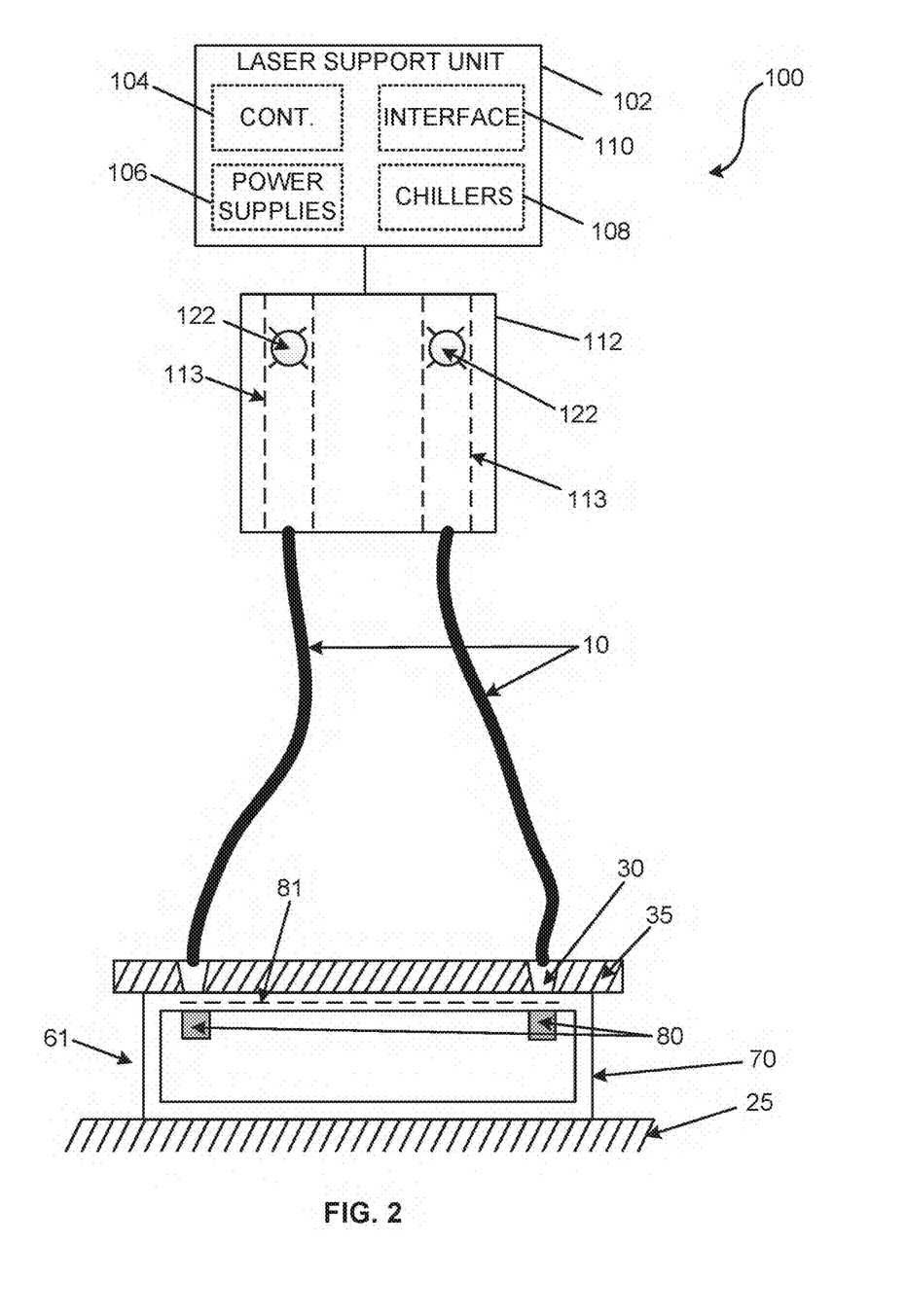
FIG. 2 is a schematic view illustrating the use of a smart part according to the present disclosure.

Under many aspects, the embodiments described according to the present disclosure are with an STTIr laser welding system, such as STTIr laser welding system 100 shown in FIG. 1. In such aspects, a smart part 70, shown in FIG. 2, is placed in the weld area 61 where the plurality of work pieces 60 would be placed during welding. In some aspects, smart piece 70 is formed with dimensions substantially similar to or the same as the plurality of work pieces 60.

Smart part 70 includes a laser light intensity sensor 80, which detects laser light generated by a laser light source 122 of a laser channel 113 that is delivered to smart part 70 by the laser delivery bundle 10 associated with that laser channel 113. Laser light intensity sensor 80 is in electrical communication with laser support unit 102 for transmitting an output signal indicative of an intensity of laser light that it senses. In some aspects, there is at least a laser light intensity sensor 80 for sensing intensity of laser light from each laser delivery bundle 10.

In an embodiment, the intensity of laser light from laser light source 122 is reduced when smart part 70 is being used. In this manner, damage may be prevented to smart part 70 and/or its associated laser light intensity sensors 80.

In an embodiment, a translucent filter 81 (shown in phantom in FIG. 2) is placed between the waveguide 30 and any associated laser light intensity sensors 80. Translucent filter 81 is translucent at a wavelength of the laser light. As a non-limiting example, translucent filter 81 may be disposed on a surface of smart part 70 while the associated laser light intensity sensors 80 are disposed within smart part 70. In such embodiments, the translucent filter 81 may be an overlay on the surface of smart part 70, such as a lacquer, paint, adhesive, or the like. In such embodiments, smart part 70 may comprise a transparent material, such as certain glasses or crystals. The translucent filter 81 is configured to spread the laser light over a larger surface area of smart part 70 than is the case without use of translucent filter 81 and thus spread the sensing of the laser light across the individual laser light intensity sensors 80. Appropriate translucent overlays include those that scatter light. Notably, the translucent overlay should be selected with a view towards spreading laser light having the wavelengths used in laser welding. Therefore, in some aspects, particularly suitable translucent overlays are selected from those that scatter light at wavelengths of about 550 nm to about 980 nm.

According to an aspect, a plurality of laser delivery bundles 10 deliver laser light through waveguide 30 to smart part 70 and there is at least a laser light intensity sensor 80 corresponding to each laser delivery bundle 10. When smart part 70 is placed in weld area 61, it is oriented so that each laser light intensity sensor 80 is located to sense the laser light delivered from the corresponding laser delivery bundle 10, such as facing an outlet end of the corresponding laser delivery bundle 10. In this fashion, the integrity of each laser delivery bundle 10 may be detected and quantified to determine whether its integrity has degraded. The intensity of the laser light generated by the laser light source 122 of the laser channel 113 associated with that laser delivery bundle 10 may also be adjusted to compensate for the degradation. By way of non-limiting example, if the intensity of laser light sensed by a laser light intensity sensor 80 is determined to be 50% of an expected intensity of laser light if its corresponding laser delivery bundle 10 was fully functional, then the intensity of the laser light generated by the laser light source 122 of the applicable laser channel 113 could be doubled such that the laser delivery bundle 10 was again delivering laser light at the desired intensity. And if, by another non-limiting example, if the intensity of laser light sensed by a laser light intensity sensor 80 is 0% of the intensity of laser light expected to have been sensed if its corresponding laser delivery bundle 10 was fully functional, controller 104 would sound an alarm for the operator to change that laser delivery bundle 10.

According to an aspect, each of laser light intensity sensors 80 correlate to a particular one of laser delivery bundles 10. Each laser light intensity sensor 80 outputs an output signal indicative of the intensity of laser light sensed by that laser light intensity sensor 80. The output signal is received by laser support unit 102 at controller 104. Controller 104 interprets the output signals and displays information relative to the integrity of each laser delivery bundle 10, such as on interface 110. This information may be displayed graphically, numerically, or in any other matter that conveys to an operator the integrity of the laser delivery optical fibers. And because each of laser light intensity sensors 80 is in electrical communication with laser support unit 102, the system (such as by controller 104) can automatically calibrate each laser channel 113 while the laser light intensity sensors 80 of smart part 70 are outputting signals to controller 104 so that each laser channel 113 outputs laser light at an appropriate intensity.

In an alternative aspect, an operator can manually adjust the intensities of the laser light generated by laser channels 113 based on the information displayed.

Figure 3:
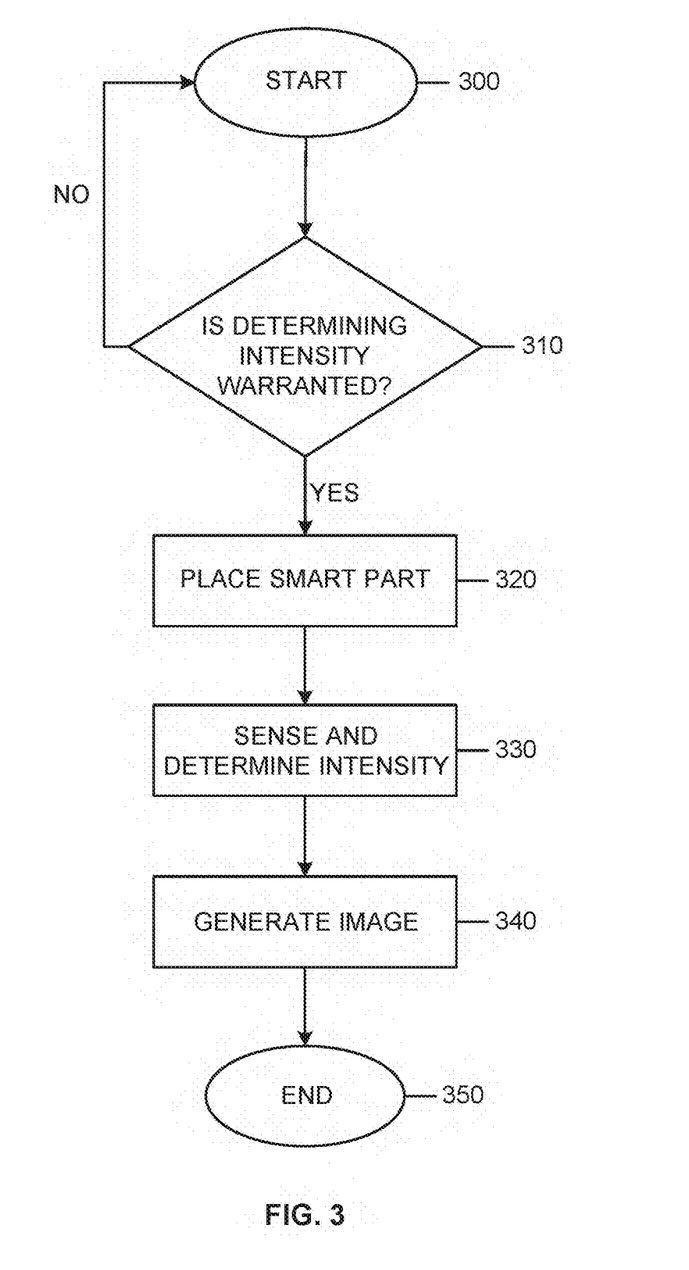
FIG. 3 is a flow chart of control logic for a control routine for providing a display image of the actual laser light intensity of a laser delivery bundle according to an embodiment of the present disclosure.

FIG. 3 is a flow chart of control logic for an example control routine implemented in a controller (such as controller 104) of a STTIr laser welding system (such as STTIr laser welding system 100) for determining whether each laser delivery bundle 10 is delivering satisfactory laser light intensity, that is, whether the integrity of each laser delivery bundle 10 has degraded or not. The control routine starts at 300 and proceeds to 310, where the controller determines whether a determination of whether the laser delivery bundles 10 are delivering satisfactory laser light intensity is warranted at that time. If not, the control routine reverts back to 300. Otherwise, a smart part 70 is placed in weld area 61 (where the plurality of work pieces 60 reside during a weld cycle and the plurality of work pieces 60 are removed if they are presently there) at 320. The control routine proceeds to 330 to sense and determine the intensity of laser light. Detecting the intensity of laser light includes generating laser light with the laser light sources 122 of each laser channel 113. In some aspects, the laser light is generated at lower intensity than used during a normal weld cycle The laser light generated by the laser channels 113 continues through the associated laser delivery bundles 10, each of which include at least a laser delivery optical fiber, through waveguide 30 to smart part 70. Each laser light intensity sensor 80 of the smart part 70 senses the intensity of the laser light delivered to it from the corresponding laser delivery bundle 10. The laser light intensity sensor 80 outputs to the controller 104 an output signal corresponding to the intensity of the laser light sensed by the laser light intensity sensor 80. The controller 104 determines the intensity of the laser light from each laser delivery bundle 10 based on the output signals from the laser light intensity sensors 80. The control routine proceeds to 340, where the controller generates a display image indicative of the sensed intensity of the laser light from each laser delivery optical fiber. A user may then adjust the intensity of the laser light coming from each laser delivery optical fiber as warranted by adjusting the intensity of the laser light generated by the laser light source of the associated laser channel 112. The control routine then ends at 350, and the smart part 70 may be removed.

It should be understood that there can be a plurality of laser banks 112 each having an associated laser support unit 102 with laser delivery bundles 10 corresponding to the laser channels 113 of each laser bank 112. In other aspects, there is a sensor associated with each laser delivery optical fiber.

Figure 4:
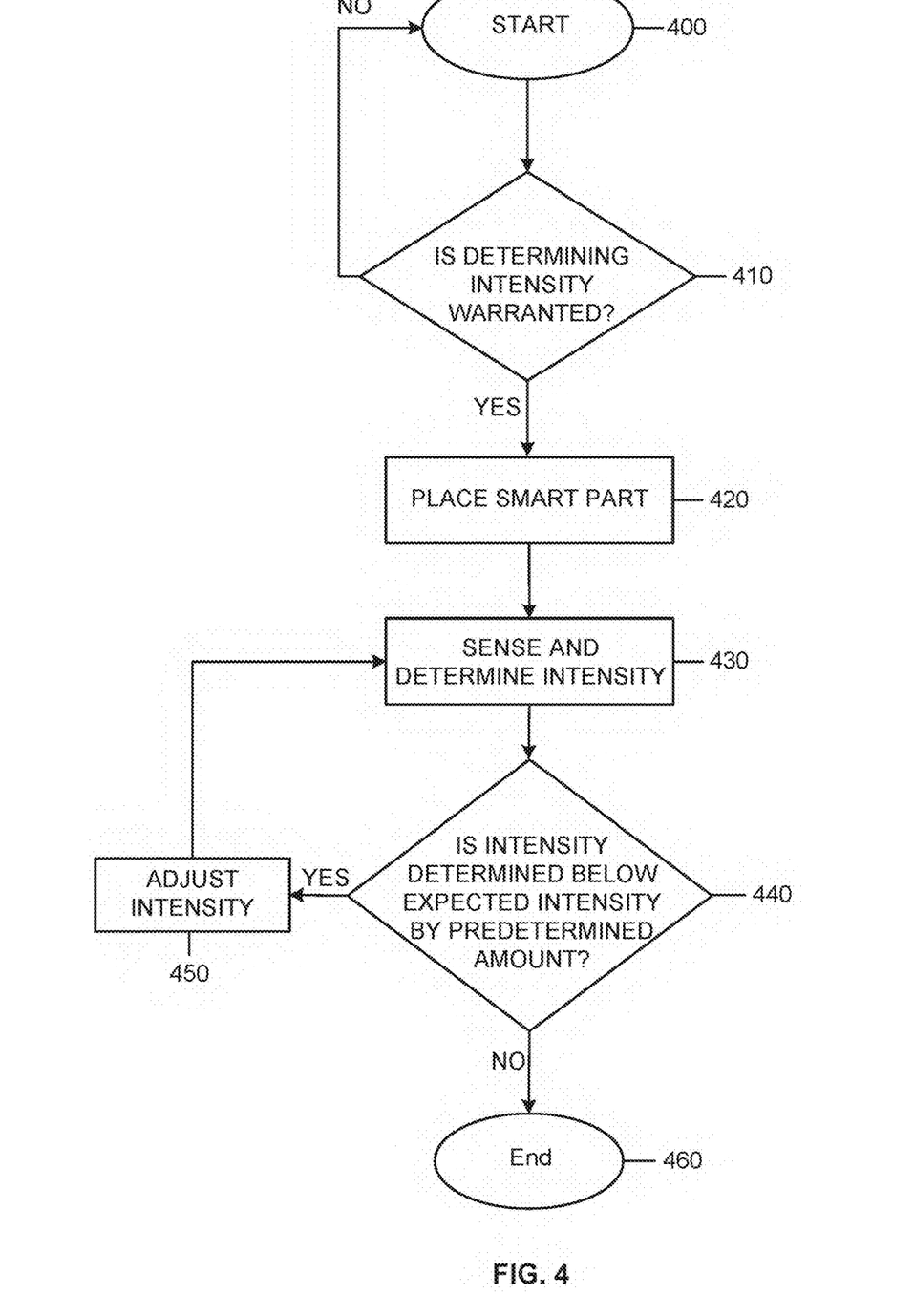
FIG. 4 is a flow chart of control logic for a control routine for determining whether integrity of a laser delivery bundle has degraded and adjusting intensity of a laser light source accordingly.

FIG. 4 is a flow chart of control logic for an example control routine implemented in a controller (such as controller 104) of a STTIr laser welding system (such as STTIr laser welding system 100) for determining whether each laser delivery bundle is delivering satisfactory laser light intensity and adjusting the intensity of laser light generated by the applicable laser light source 122 when it is not. The control routine starts at 400 and proceeds to 410, where the controller determines whether a determination of whether the laser delivery bundles 10 are delivering satisfactory laser light intensity is warranted at that time. If not, the control routine reverts back to 400. Otherwise, at 420 a smart part 70 is placed in weld area 61 (where plurality of work pieces 60 typically resides during a weld cycle and the plurality of work pieces 60 are removed if they are presently there). The control routine proceeds to 430 to sense and determine the intensity of the laser light. Detecting the intensity of laser light includes generating laser light with the laser light sources 122 of each laser channel 113. In some aspects, the laser light is generated at lower intensity than used during a normal weld cycle The laser light generated by the laser channels 113 continues through the associated laser delivery bundles 10, each of which include at least a laser delivery optical fiber, through waveguide 30 to smart part 70. Each laser light intensity sensor 80 of the smart part 70 senses the intensity of the laser light delivered to it from the corresponding laser delivery bundle 10. The laser light intensity sensor 80 outputs to the controller 104 an output signal corresponding to the intensity of the laser light sensed by the laser light intensity sensor 80. The controller 104 determines the intensity of the laser light from each laser delivery bundle 10 based on the output signals from the laser light intensity sensors 80. The control routine proceeds to 440 and compares the determined intensity of the laser light from each laser delivery bundle 10 to an expected intensity for each such laser delivery bundle 10. It should be understood that the expected intensities for the laser delivery bundles 10 can be the same or different. In an aspect, the expected intensity for a laser delivery bundle 10 is the intensity of the laser light generated by the applicable laser light source for that laser delivery bundle 10. As used herein, the applicable laser light source for a laser delivery bundle 10 is the laser light source 122 of the laser channel associated with that laser delivery bundle 10. If the determined intensity for each of the laser delivery bundles 10 is not less than the applicable expected intensity for that laser delivery bundle 10 by a predetermined amount, the control routine ends at 460. It should be understood that the applicable predetermined amount for each laser delivery bundle 10 can be the same or different. Each applicable predetermined amount is for example a predetermined percentage, such as 50%. Otherwise, the control routine proceeds to 450 where it adjusts the intensity of the laser light generated by the applicable laser light for each laser delivery bundle as warranted. The control routine ends at 470. It should be understood that the control routine could go directly from 450 to 470. In an aspect, at 450 the control routine adjusts the intensity generated by the applicable laser light for each laser delivery bundle 10 whose integrity was determined to have degraded. The control routine determines that the integrity of a laser delivery bundle 10 has degraded when the determined intensity for that laser delivery bundle 10 is less than the applicable expected intensity for that laser delivery bundle 10 by the applicable predetermined amount.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for determining intensity of laser light at a weld area of a simultaneous laser welding system, the simultaneous laser welding system having a plurality of laser channels controlled by a controller and a corresponding plurality of fiber optic bundles with each one of the laser channels coupled to an associated one of the plurality of fiber optic bundles, each laser channel having a laser light source, the method comprising:

placing a smart part having a laser light intensity sensor corresponding to each fiber optic bundle in the weld area;

directing laser light from the laser light source of each laser channel through the fiber optic bundle corresponding to that laser channel to the weld area;

sensing the laser light from each fiber optic bundle with the laser light intensity sensor of the smart part corresponding to the fiber optic bundle;

outputting from each laser light intensity sensor an output signal indicative of the intensity of the laser light sensed by that light intensity sensor and providing each output signal to a controller; and     determining with the controller the intensity of laser light at the weld area provided by each laser channel based on the output signal from each laser light intensity sensor.

2. The method of claim 1 further including disposing a waveguide around the smart part and delivering the laser light from each fiber optical bundle through the waveguide to homogenize the laser light with the waveguide before the laser light impinges on the smart part.

3. The method of claim 2 including for each laser channel, comparing with the controller the intensity of laser light sensed by the smart part laser light intensity sensor corresponding to the fiber optic bundle associated with that laser channel with an expected intensity and determining with the controller that an integrity of that fiber optic bundle has degraded when the intensity of the laser light sensed by the smart part sensor is less than the expected intensity by at least a predetermined amount.

4. The method of claim 2 including for each laser channel, controlling the laser channel with the controller to adjust an intensity of laser light generated by the laser light source of the laser channel based on the intensity of laser light sensed by the smart part laser light intensity sensor corresponding to the fiber optic bundle associated with that laser channel laser so that the intensity of laser light at that smart part laser light intensity sensor is at desired level.

5. The method of claim 2 including controlling the laser channels with the controller to adjust an intensity of laser light generated by the laser light sources of the laser channels based on the intensity of laser light sensed by the smart part laser light intensity sensors so that the intensity of laser light at the smart part is at desired level.

6. The method of claim 2 including disposing a filter translucent at a wavelength of the laser light between the sensors of the smart part and the waveguide to spread the laser light across the sensors.

7. The method of claim 1 including displaying via the controller an image indicative of the intensity of the sensed laser light based on the output signals of the laser light intensity sensors.

8. A simultaneous laser welding system comprising:
a plurality of laser channels, wherein each laser channel has a laser light source;
a corresponding plurality of fiber optic bundles each having two ends, wherein each laser channel is coupled to an associated one of the plurality of fiber optic bundles at the first ends of each of the plurality of fiber optic bundles;
a weld area defined by the second ends of each of the plurality of the fiber optic bundles;
a smart part located in the weld area, wherein the smart part is comprised of at least a laser light intensity sensor corresponding to each fiber optic bundle, wherein the laser light intensity sensor generates and transmits an output signal indicative of the intensity of laser light sensed by the laser light intensity sensor;
and a controller, wherein the controller is configured to control the plurality of laser channels, the controller is configured to receive the output signal from the laser light intensity sensor, and the controller is configured to determine the intensity of laser light at the weld area provided by each laser channel based on the output signal from each laser light intensity sensor.

9. The simultaneous laser welding system of claim 8, further comprising a waveguide disposed around the smart part, wherein the waveguide homogenizes laser light traveling from the first ends of each of the plurality of fiber optic bundles through the second ends of each of the plurality of fiber optic bundles.

10. The simultaneous laser welding system of claim 9, wherein the controller is further configured to compare the intensity of laser light sensed by the smart part laser light intensity sensor corresponding to the fiber optic bundle associated with that laser channel with an expected intensity and determine that an integrity of that fiber optic bundle has degraded when the intensity of the laser light sensed by the smart part sensor is less than the expected intensity by at least a predetermined amount.

11. The simultaneous laser welding system of claim 9, wherein the controller is further configured to control the laser channel to adjust an intensity of laser light generated by the laser light source of the laser channel based on the intensity of laser light sensed by the smart part laser light intensity sensor corresponding to the fiber optic bundle associated with that laser channel laser so that the intensity of laser light at that smart part laser light intensity sensor is at desired level.

12. The simultaneous laser welding system of claim 9, wherein the controller is further configured to adjust an intensity of laser light generated by the laser light sources of the laser channels based on the intensity of laser light sensed by the smart part laser light intensity sensors so that the intensity of laser light at the smart part is at desired level.

13. The simultaneous laser welding system of claim 9 further comprising a filter disposed between the sensors of the smart part and the waveguide, wherein the filter is translucent at a wavelength of the laser light to spread the laser light across the sensors.

14. The simultaneous laser welding system of claim 8, wherein the controller is configured to display an image indicative of the intensity of the sensed laser light based on the output signals of the laser light intensity sensors.

* * * * *